(12) United States Patent
Wang et al.

(10) Patent No.: US 11,481,204 B2
(45) Date of Patent: Oct. 25, 2022

(54) AUTOMATIC GENERATION OF A SOFTWARE CONFIGURATION FOR LICENSE RECONCILIATION

(71) Applicant: ServiceNow, Inc., Santa Clara, CA (US)

(72) Inventors: Ning Wang, Sunnyvale, CA (US); Gyanesh Hari Dwivedi, Fremont, CA (US); Nirali A. Vora, Milpitas, CA (US)

(73) Assignee: ServiceNow, Inc., Santa Clara, CA (US)

( * ) Notice: Subject to any disclaimer, the term of this patent is extended or adjusted under 35 U.S.C. 154(b) by 47 days.

(21) Appl. No.: 17/194,932

(22) Filed: Mar. 8, 2021

(65) Prior Publication Data

US 2021/0191704 A1    Jun. 24, 2021

Related U.S. Application Data

(63) Continuation of application No. 16/228,352, filed on Dec. 20, 2018, now Pat. No. 10,949,186.

(51) Int. Cl.
*G06F 9/445* (2018.01)
*G06F 8/61* (2018.01)
*G06F 21/10* (2013.01)
*G06F 16/23* (2019.01)

(52) U.S. Cl.
CPC ............ *G06F 8/61* (2013.01); *G06F 16/2365* (2019.01); *G06F 21/105* (2013.01); *G06F 2221/0766* (2013.01)

(58) Field of Classification Search
CPC ...... G06F 8/61; G06F 16/2365; G06F 21/105; G06F 2221/0766
USPC .................................................. 717/168–178
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |

(Continued)

*Primary Examiner* — Chuck O Kendall
(74) *Attorney, Agent, or Firm* — Fletcher Yoder PC

(57) ABSTRACT

A computing system may include a database and server device(s) disposed within a remote network management platform. The database may contain (i) discovery information for installations of software applications on computing devices of a managed network, and (ii) software configurations for a subset of the software applications, the software configurations respectively indicating rights allocations and consumption for each of the subset of the software applications. The server device(s) may be configured to: determine that the software configurations do not support a particular software application, where the discovery information indicates that the particular software application is installed on computing device(s) of the managed network; and responsively, generate a particular software configuration for the particular software application, the particular software configuration indicating: (i) a rights allocation of zero rights, and (ii) a rights consumption according to the discovery information; and update the database to include the particular software configuration.

20 Claims, 10 Drawing Sheets

(56) References Cited

U.S. PATENT DOCUMENTS

| | | |
|---|---|---|
| 7,350,209 B2 | 3/2008 | Shum |
| 7,392,300 B2 | 6/2008 | Anantharangachar |
| 7,617,073 B2 | 11/2009 | Non |
| 7,685,167 B2 | 3/2010 | Mueller |
| 7,716,353 B2 | 5/2010 | Golovinsky |
| 7,769,718 B2 | 8/2010 | Murley |
| 7,890,802 B2 | 2/2011 | Gerber |
| 7,925,981 B2 | 4/2011 | Pourheidar |
| 7,933,927 B2 | 4/2011 | Dee |
| 7,945,860 B2 | 5/2011 | Vambenepe |
| 8,082,222 B2 | 12/2011 | Rangarajan |
| 8,151,261 B2 | 4/2012 | Sirota |
| 8,346,752 B2 | 1/2013 | Sirota |
| 8,380,645 B2 | 2/2013 | Kowalski |
| 8,402,127 B2 | 3/2013 | Solin |
| 8,554,750 B2 | 10/2013 | Rangaranjan |
| 8,612,408 B2 | 12/2013 | Trinon |
| 8,646,093 B2 | 2/2014 | Myers |
| 8,683,032 B2 | 3/2014 | Spinelli |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,261,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,508,051 B2 | 11/2016 | Falk |
| 9,534,903 B2 | 1/2017 | Cline |
| 9,535,674 B2 | 1/2017 | Cooper |
| 9,535,737 B2 | 1/2017 | Joy |
| 9,613,070 B2 | 4/2017 | Kumar |
| 9,631,934 B2 | 4/2017 | Cline |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 9,967,162 B2 | 5/2018 | Spinelli |
| 10,002,203 B2 | 6/2018 | George |
| 11,281,442 B1 * | 3/2022 | Tal ............ G06F 8/60 |
| 2015/0227268 A1 | 8/2015 | Rathod |

* cited by examiner

Product Result
PR0002037

| | |
|---|---|
| Number | PR0002037 |
| Publisher | ABC |
| Product | XYZ |
| Group | -- None -- |
| Subgroup | -- None -- |

Reconciliation Result: RR0001038
Status: Not Compliant
True-up cost: $0.00
Over-licensed amount: $159,000.00
Potential savings: $0.00

— 602
— 606
— 604

Software Model Results (2) | Unlicensed Installs (751) — 614
— 608

| | Status | Software model | Unlicensed installs | True-up cost | Over-licensed amount |
|---|---|---|---|---|---|
| 610 → | ⊙ Compliant | ABC XYZ V1 | 0 | $0.00 | $96,000.00 |
| 612 → | ⊙ Compliant | ABC XYZ V2 | 0 | $0.00 | $63,000.00 |

FIG. 6

900 → DETERMINE, BY ONE OR MORE SERVER DEVICES AND FROM A DATABASE, DISCOVERY INFORMATION FOR INSTALLATIONS OF SOFTWARE APPLICATIONS ON COMPUTING DEVICES OF A MANAGED NETWORK, WHERE THE ONE OR MORE SERVER DEVICES AND THE DATABASE ARE DISPOSED WITHIN A REMOTE NETWORK MANAGEMENT PLATFORM ASSOCIATED WITH THE MANAGED NETWORK, WHERE THE DATABASE CONTAINS THE DISCOVERY INFORMATION, WHERE THE DATABASE ALSO CONTAINS SOFTWARE CONFIGURATIONS FOR A SUBSET OF THE SOFTWARE APPLICATIONS, WHERE AT LEAST SOME OF THE DISCOVERY INFORMATION FOR THE INSTALLATIONS WAS OBTAINED BY THE REMOTE NETWORK MANAGEMENT PLATFORM INDIRECTLY ACCESSING THE COMPUTING DEVICES, WHERE THE DISCOVERY INFORMATION FOR THE INSTALLATIONS INCLUDES RESPECTIVE INDICATIONS OF APPLICATION PUBLISHERS, APPLICATION TITLES, AND APPLICATION VERSIONS FOR THE SOFTWARE APPLICATIONS, AND WHERE THE SOFTWARE CONFIGURATIONS RESPECTIVELY INDICATE RIGHTS ALLOCATIONS AND RIGHTS CONSUMPTION FOR EACH OF THE SUBSET OF THE SOFTWARE APPLICATIONS

902 → DETERMINE, BY THE ONE OR MORE SERVER DEVICES, THAT THE SOFTWARE CONFIGURATIONS DO NOT SUPPORT A PARTICULAR SOFTWARE APPLICATION OF THE SOFTWARE APPLICATIONS, WHERE THE DISCOVERY INFORMATION FOR THE INSTALLATIONS INDICATES THAT THE PARTICULAR SOFTWARE APPLICATION IS INSTALLED ON ONE OR MORE OF THE COMPUTING DEVICES OF THE MANAGED NETWORK

904 → IN RESPONSE TO DETERMINING THAT THE SOFTWARE CONFIGURATIONS DO NOT SUPPORT THE PARTICULAR SOFTWARE APPLICATION, GENERATE, BY THE ONE OR MORE SERVER DEVICES, A PARTICULAR SOFTWARE CONFIGURATION FOR THE PARTICULAR SOFTWARE APPLICATION, WHERE THE PARTICULAR SOFTWARE CONFIGURATION INDICATES: (I) A PARTICULAR RIGHTS ALLOCATION OF ZERO RIGHTS, AND (II) A PARTICULAR RIGHTS CONSUMPTION ACCORDING TO THE DISCOVERY INFORMATION FOR THE INSTALLATIONS

906 → UPDATE, BY THE ONE OR MORE SERVER DEVICES, THE DATABASE TO INCLUDE THE PARTICULAR SOFTWARE CONFIGURATION

FIG. 9

AUTOMATIC GENERATION OF A SOFTWARE CONFIGURATION FOR LICENSE RECONCILIATION

CROSS REFERENCE TO RELATED APPLICATION

This application is a continuation of U.S. Non-Provisional application Ser. No. 16/228,352, entitled "AUTOMATIC GENERATION OF A SOFTWARE CONFIGURATION FOR LICENSE RECONCILIATION", filed on Dec. 20, 2018, and will issue on Mar. 9, 2021 as U.S. Pat. No. 10,949,186, which is herein incorporated by reference in its entirety for all purposes.

BACKGROUND

An enterprise may use many computing devices to efficiently facilitate and manage its many interrelated operations. Each such computing device may have one or more software applications installed thereon. Where the software is proprietary, the enterprise may procure licenses for the computing devices to use the software. Given this, the enterprise may seek to properly track license rights allocations and consumption associated with the software applications, so as to ensure that the license rights consumption complies with the license rights allocations and/or with other constraints imposed by the enterprise.

SUMMARY

In practice, a system may provide a remote network management platform that manages a managed network of an enterprise. The system may discover instances of software applications installed on computing devices in the managed network. Also, the system may collect and store identifying information about software applications of the managed network, such as information indicating respective publisher(s), title(s), version(s), and/or edition(s) for the software applications. Further, the system may maintain software configurations (could also be referred to as software models) that respectively indicate license right allocations and consumption for at least some of the software applications of the managed network.

Generally, the enterprise could use the remote network management platform to establish software configurations that can help the enterprise track license rights allocations and consumption associated with software applications of the managed network. For example, the system may provide, to a client device, a representation of a graphical user interface (GUI) that includes feature(s) for establishing software configuration(s). Through this GUI, a user of the client device may provide input to specify identifying information and license right allocations for a given software application, so as to establish a given software configuration for a given software application. Further, the system could update the given software configuration to specify an installation count for the given software application according to the above-mentioned discovery, thereby causing the given software configuration to indicate a license rights consumption for the given software application.

In turn, the system could determine whether usage of software applications complies with licenses associated with the software applications. For example, several software applications may have a common publisher and title, but may be of different respective versions. Given this, the system may use the software configurations of these software applications to determine whether compliance exists with respect to each version. To facilitate this, for each such software application, the system could refer to the respective software configuration of the software application, so as to determine whether the license rights consumption for the software application complies with the license right allocations for the software application.

Moreover, the system could determine whether compliance exists with respect to the title that is common to the several software applications at issue. To facilitate this, the system could determine total license right allocations and total license rights consumption for these software applications that have the common publisher and title. In practice, the system could determine the total license right allocations based on the respective license right allocations specified in the software configurations of these software applications, and the system could determine the total license rights consumption by determining a total installation count for these software applications according to the discovery, among other options. In any case, the system could determine whether compliance exists with respect to the title by determining whether the total license rights consumption complies with the total license right allocations.

Given this, the remote network management platform could help the enterprise ascertain whether compliance exists on various levels. For example, the system may generate a representation of a GUI according to the above-described determinations of compliance. The system could then provide this representation to a client device, so as indicate whether compliance exists on various levels for the above-mentioned software applications that have a common publisher and title, but are of different respective versions. Specifically, the representation may include, (i) for each such software application, a respective indication of whether the software application is in or out of compliance, and (ii) an indication of whether compliance exists with respect to the common title.

Although the remote network management platform can be helpful, some situations could still cause ambiguity as to whether or not compliance exists on certain level(s).

For example, in the described situation where software applications have a common publisher and title, an enterprise might inadvertently end up not establishing a software configuration for a given one of those applications. In turn, the system might not be able to determine whether usage of the given software application complies with license(s) associated with that software application, and thus the system might end up providing, to a client device, a representation of a GUI that excludes an indication of whether the given software application is in compliance. Also, because the system does not have a software configuration for the given software application, the system might determine, with respect to the common title, a total license right allocations that does not account for license right allocations of the given software application. Yet, because the system may have an installation count for the given software application according to discovery, the system may still account for that installation count when determining a total license rights consumption with respect to the common title.

As a result, although the representation excludes an indication of whether the given software application is in compliance, that representation may still include respective indications that all of the other software applications are in compliance as well as an indication that the common title is out of compliance. This might be problematic, as it might be unclear to a user of the client device why the common title is out of compliance when all of the listed software applications are in compliance. Other examples are also possible.

Disclosed herein is an approach for automatic generation of a software configuration based on discovery information, which could help overcome the above-mentioned issues, and could provide for other advantages as well. According to the disclosed approach, the system could determine that existing software configurations do not support a particular software application of a managed network, and the system could responsively generate and store a new software configuration for that particular software application.

For example, the system may have discovery information indicating that the particular software application is installed on computing device(s) in the managed network and also indicating a particular publisher, a particular title, and a particular version for the particular software application. Yet, the system may determine that none of the existing software configurations are associated with that particular publisher, title, and version. Thus, the system may responsively generate and store the new software configuration. The system may generate this new software configuration such that it is associated with the particular publisher, particular title, and particular version. Moreover, the system may generate the new software configuration to indicate a license right allocation of zero rights and a license rights consumption (e.g., installation count) according to the discovery information for the particular software application.

Given this, in a situation where the particular software application and other software applications have a common publisher and title, the system could provide, to a client device, a representation of a GUI that unambiguously indicates whether compliance exists on various levels. For instance, in line with the discussion above, this representation might include respective indications that all of the other software applications are in compliance as well as an indication that the common title is out of compliance. But in this case, because the system generated the new software configuration for the particular software application, the representation would also indicate that the particular software application is out of compliance. Thus, the representation would overcome the described issues, as it would make clear to a user of the client device that the common title is out of compliance because the particular software application is out of compliance.

In turn, the user could proceed to obtain licenses for the particular software application and then update the system (e.g., the new software configuration) to include license right allocations for the particular software application. Or if the enterprise previously obtained licenses for the particular software application, then the user could update the system to include license right allocations for the particular software application. In either case, the disclosed approach can advantageously help the enterprise better track license rights allocations and consumption, so as to ensure proper compliance. Other examples are also possible.

Accordingly, a first example embodiment may involve a computing system including a database and one or more server devices disposed within a remote network management platform associated with a managed network.

The database may contain: (i) discovery information for installations of software applications on computing devices of the managed network, and (ii) software configurations for a subset of the software applications, where at least some of the discovery information for the installations was obtained by the remote network management platform indirectly accessing the computing devices, where the discovery information for the installations includes respective indications of application publishers, application titles, and application versions for the software applications, and where the software configurations respectively indicate rights allocations and rights consumption for each of the subset of the software applications.

The one or more server devices may be configured to: determine that the software configurations do not support a particular software application of the software applications, where the discovery information for the installations indicates that the particular software application is installed on one or more of the computing devices of the managed network; in response to determining that the software configurations do not support the particular software application, generate a particular software configuration for the particular software application, where the particular software configuration indicates: (i) a particular rights allocation of zero rights, and (ii) a particular rights consumption according to the discovery information for the installations; and update the database to include the particular software configuration.

A second example embodiment may involve determining, by one or more server devices and from a database, discovery information for installations of software applications on computing devices of a managed network, where the one or more server devices and the database are disposed within a remote network management platform associated with the managed network, where the database contains the discovery information, where the database also contains software configurations for a subset of the software applications, where at least some of the discovery information for the installations was obtained by the remote network management platform indirectly accessing the computing devices, where the discovery information for the installations includes respective indications of application publishers, application titles, and application versions for the software applications, and where the software configurations respectively indicate rights allocations and rights consumption for each of the subset of the software applications.

The second example embodiment may also involve determining, by the one or more server devices, that the software configurations do not support a particular software application of the software applications, where the discovery information for the installations indicates that the particular software application is installed on one or more of the computing devices of the managed network. The second example embodiment may additionally involve, in response to determining that the software configurations do not support the particular software application, generating, by the one or more server devices, a particular software configuration for the particular software application, where the particular software configuration indicates: (i) a particular rights allocation of zero rights, and (ii) a particular rights consumption according to the discovery information for the installations. The second example embodiment may further involve updating, by the one or more server devices, the database to include the particular software configuration.

In a third example embodiment, an article of manufacture may include a non-transitory computer-readable medium, having stored thereon program instructions that, upon execution by a computing system, cause the computing system to perform operations in accordance with the first and/or second example embodiments.

In a fourth example embodiment, a computing system may include at least one processor, as well as memory and program instructions. The program instructions may be stored in the memory, and upon execution by the at least one processor, cause the computing system to perform operations in accordance with the first and/or second example embodiments.

In a fifth example embodiment, a system may include various means for carrying out each of the operations of the first and/or second example embodiments.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6 depicts a GUI representation, in accordance with example embodiments.

FIG. 9 is another flow chart, in accordance with example embodiments.

DETAILED DESCRIPTION

Figure 1:
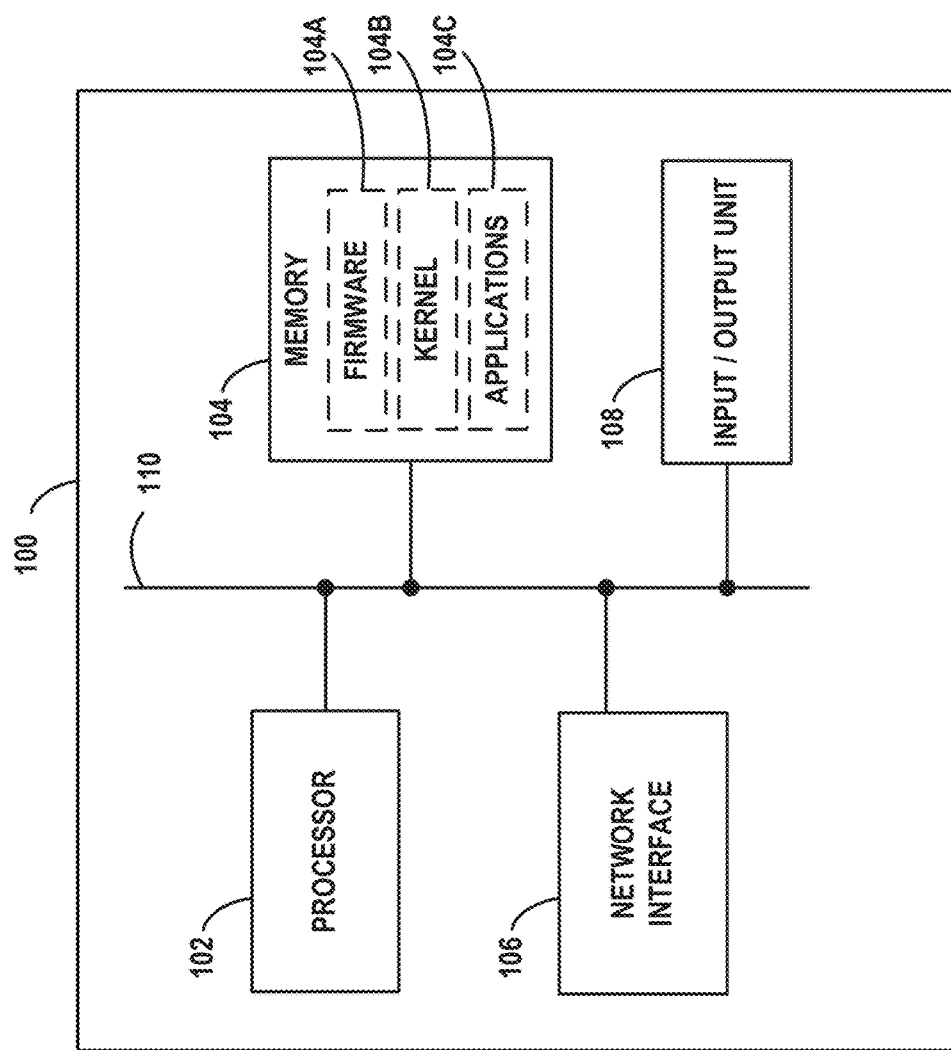
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
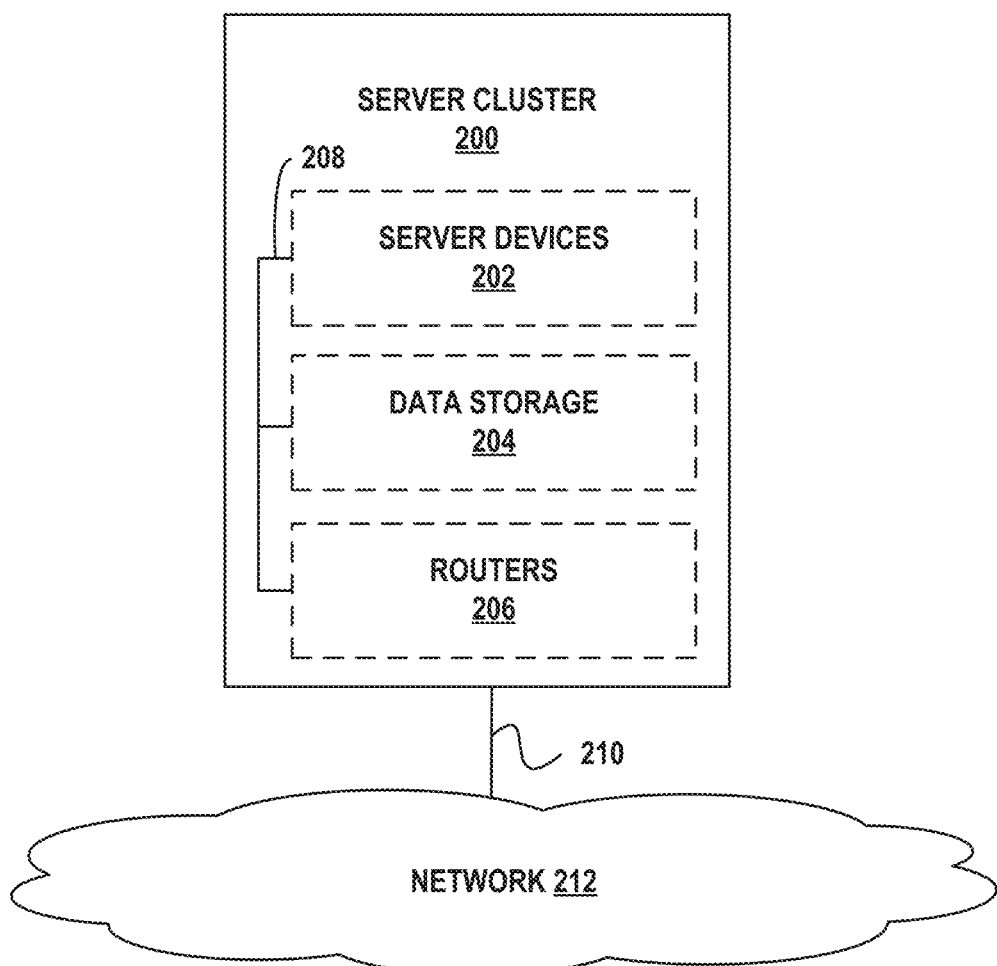
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
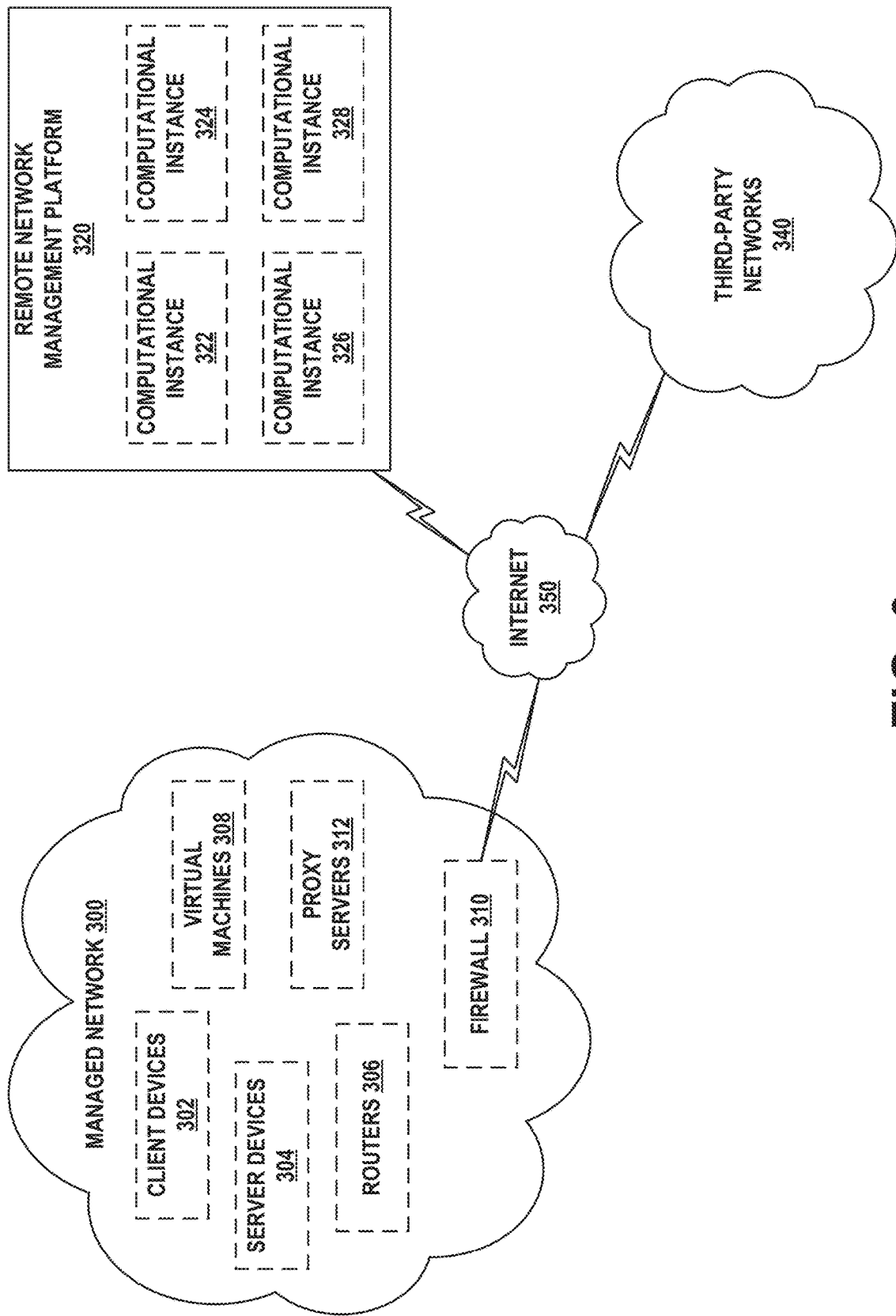
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
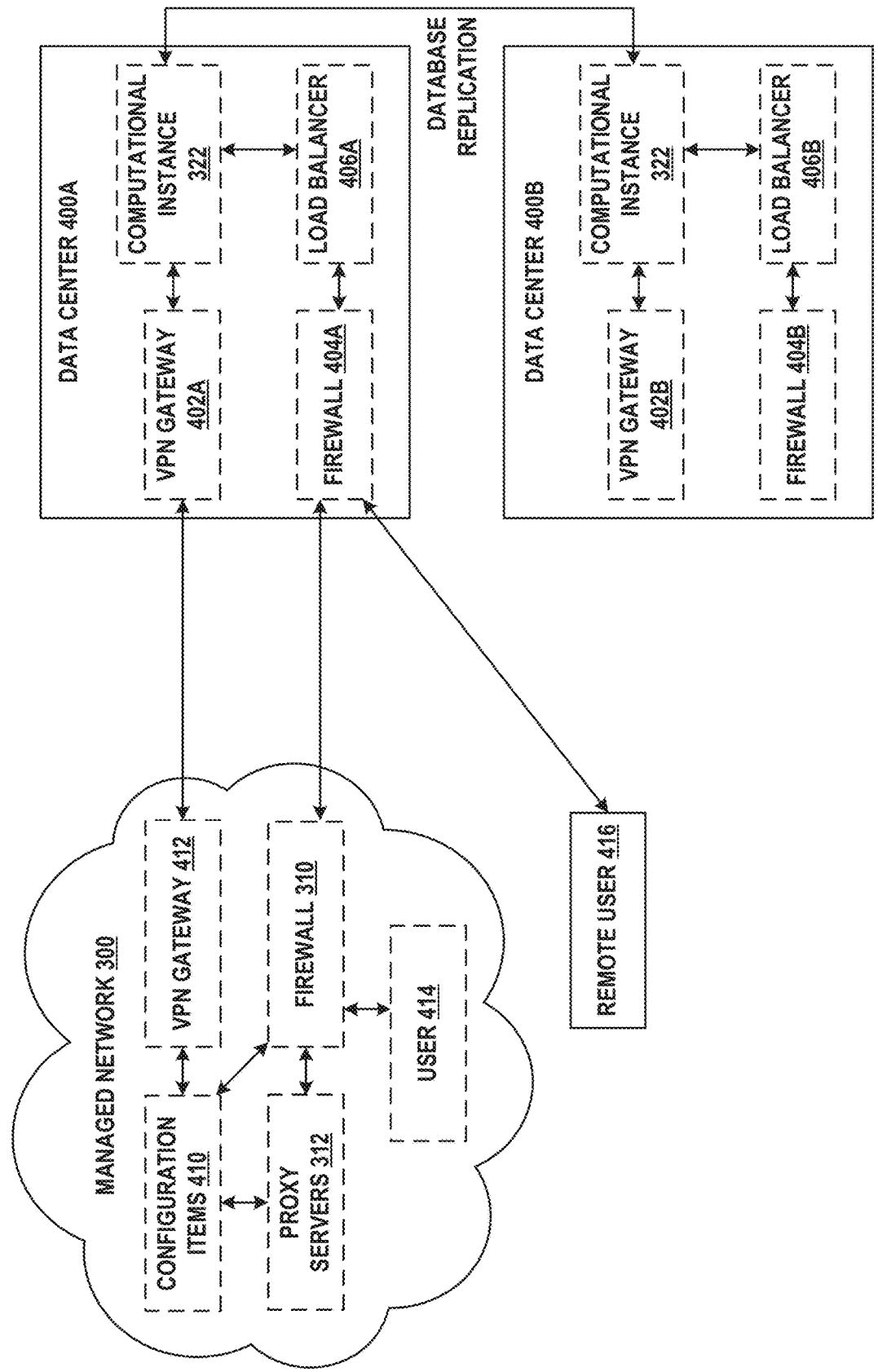
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
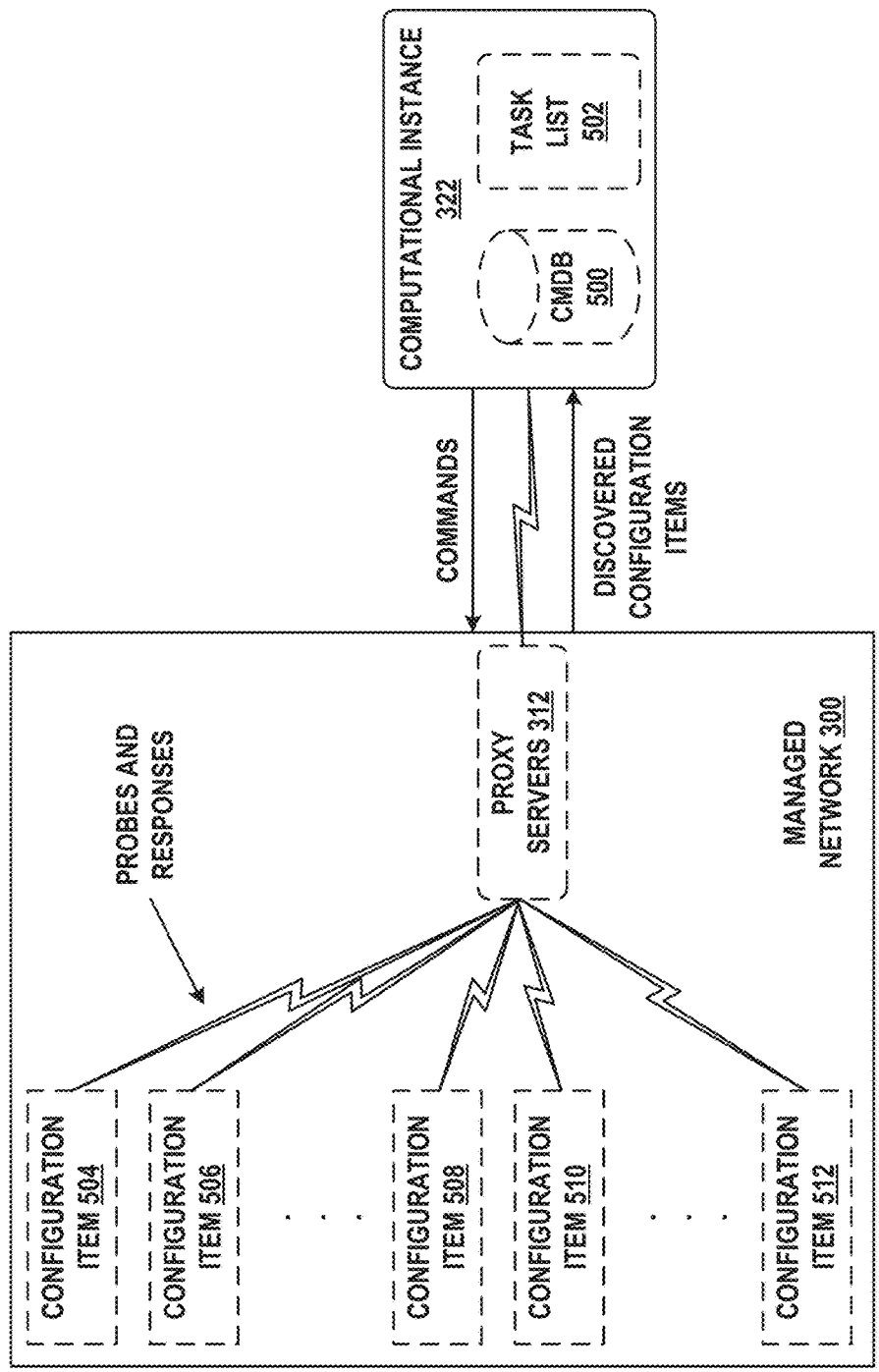
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
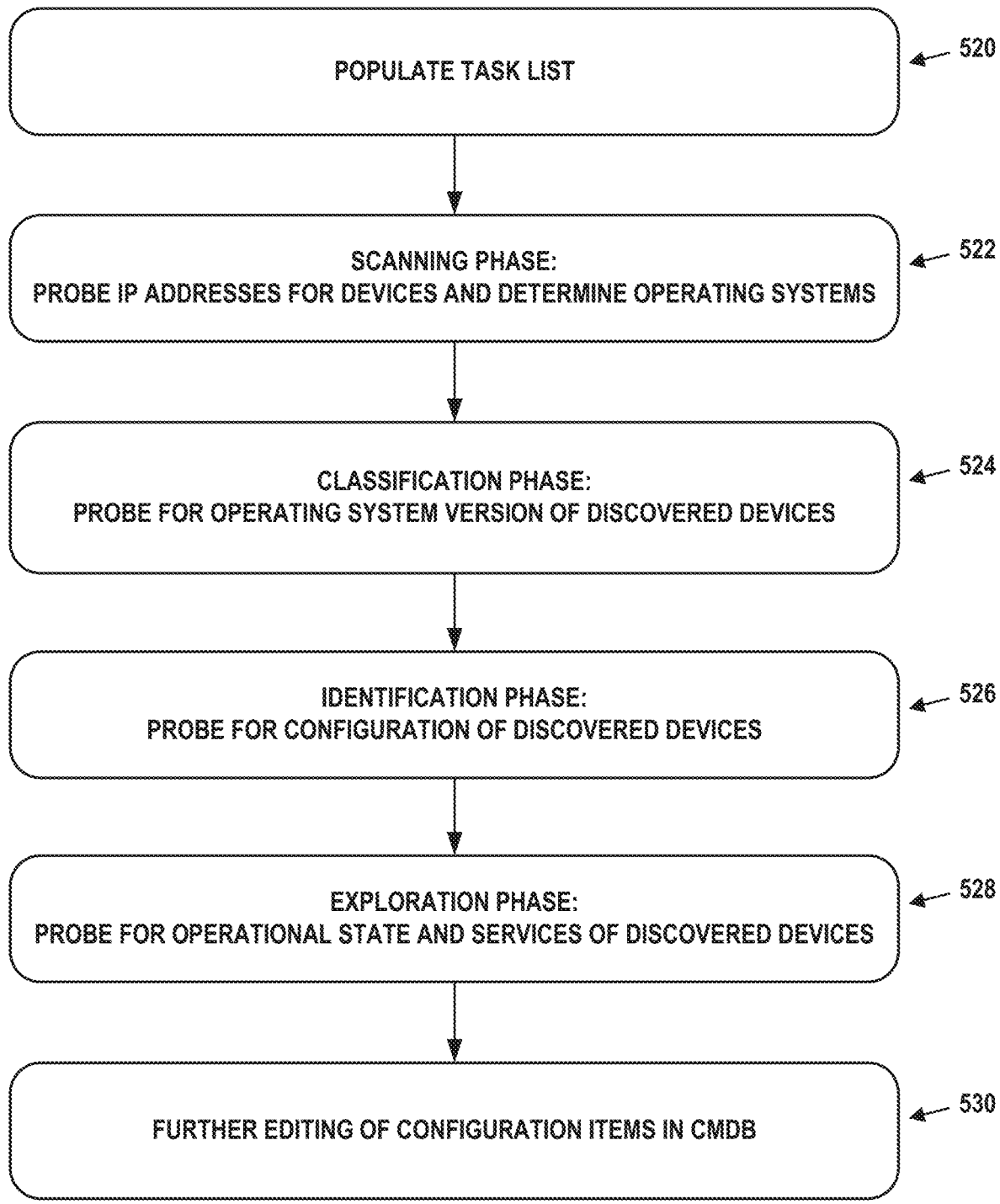
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Example Software Licensing and Software Configurations

An enterprise may use the computing devices described above in relation to FIGS. 1 and 2 to facilitate and manage its many interrelated operations. In turn, the computing devices may rely on software applications to perform tasks. Each computing device may be tasked with performing a set of operations, and accordingly may use a combination of software applications to perform those tasks. While some such software applications may be hosted by an aPaaS system, as described above in relation to FIGS. 1 through 4, others may be installed on the individual computing devices themselves. Such software is often proprietary, and may be licensed in several ways.

By way of example, a software license may include "per-device" license rights, which may specify a number of computing/server devices that are permitted to use the software. In another example, computing devices may include various physical processors, and a software license may include "per-processor" license rights, which may specify a number of physical processors having permission to use the software. In yet another example, computing devices may include multi-core processors, and a software license may include "per-core" license rights, which may specify a number of processor cores having permission to use the software. Other examples are also possible.

Moreover, each software license may specify costs related to use of software. For example, with regard to per-device license rights, a software license may specify a licensing cost per device that uses the software (e.g., a cost of $1,200 for each computing device that has the software installed thereon). In another example, with regard to per-processor license rights, a software license may specify a licensing cost per physical processor that uses the software (e.g., a cost of $500 for each processor on which the software is installed). In yet another example, with regard to per-core license rights, a software license may specify a licensing cost per processor core that uses the software (e.g., a cost of $200 for each processor core on which the software is installed). In yet other examples, a software license may have a more complex costs arrangement, as the cost per device, processor, and/or core may vary depending on the number of device, processors and/or cores using the software (e.g., a cost of $500 per processor for the first ten processors that have the software installed thereon and a cost of $450 per processor for the next ten processors that have the software installed thereon, and so on.) Other licensing schemes are possible as well.

Regardless of the licensing scheme, the enterprise may attempt to keep track of which of its computing devices, physical processors, and/or processor cores use what licensed software. In so doing, the enterprise may determine whether it is in compliance with its various software licenses, whether it is using its licensed software efficiently, and/or whether it should purchase new software licenses.

Tracking software application usage across an entire enterprise may present challenges. A large enterprise may use thousands of separate computing devices, each of which may use a set of software applications. Further, such computing devices may go in and out of service, require different software applications over time, and/or require different hardware configurations over time, among other possibilities. Moreover, certain software applications may be installed and/or uninstalled from certain computing devices without supervision or notice.

Tracking the use of software within an enterprise may be achieved using an aPaaS system as described above in relation to FIGS. 1 through 5B. Such an aPaaS system may be particularly suited to tracking such software usage because the aPaaS system may gather information from computing devices in managed networks such as the enterprise.

Tracking the use of software within an enterprise may involve determining configuration items in the manner described above in relation to FIGS. 5A through 5B. For instance, the aPaaS system may determine which software applications are installed on computing devices within managed network 300 in a similar fashion to the example scenario described above with regard to FIGS. 5A and 5B.

To accurately track such software usage, the aPaaS system could determine which computing devices, physical processors, and/or processor cores utilize what software applications. For example, during identification phase 526 of discovery, customer instance 322 may determine the configuration of discovered devices, including identification parameters indicative of specific computing devices. Further, during exploration phase 528, customer instance 322 may determine services such as software applications of each discovered device. The identification parameters associated with such software applications may indicate on which specific computing device(s) each software application is installed. However, the identification parameters may additionally or alternatively specify a number of processors or cores of a computing device, a device name, or a named user, associated with each software application. As such, depending on the licensing scheme, the aPaaS system could count software installations per-device, per-processor, or per-core, among other options.

When determining an installation count for a particular software application under a per-device license metric, the aPaaS system may count each computing device within the managed network where the particular software application is deployed, even where installed software applications are using more than one processor or processor core on certain of the computing devices. For instance, a computing device that runs the particular software application may have two processors contained therein, and each processor may include four cores. If each core of each processor is used to run the particular software application, totaling eight cores running the software application, only one installation would be counted when using the per-device license metric.

When determining an installation count for a particular software application under a per-processor license metric, the aPaaS system may count each processor of computing devices on which the particular software application is deployed. For example, when a computing device that runs the particular software application has two processors, both processors would be counted when using the per-processor license metric. However, if each processor included four cores, the installation count would still equal two under the per-processor license metric.

In this regard, a definition of a per-processor license metric could depend on the software publisher in question. For example, in some cases, one or more processors of computing device(s) could each respectively have a particular software application installed thereon. And when determining an installation count under a per-processor license metric, the aPaaS system could count each processor within the managed network that has the particular software application installed thereon. Other examples are also possible.

When determining an installation count for a particular software application under a per-core license metric, the aPaaS system may count each core within the managed network where the particular software application is deployed. For example, when a computing device that runs the particular software application has two processors each having four cores, eight installations would be counted under the per-core license metric.

In this regard, a definition of per-core license metric could depend on the software publisher in question. For example, in some cases, one or more cores within computing device(s) could each respectively have a particular software application installed thereon. And when determining installation count under a per-core license metric, the aPaaS system could count each core within the managed network that has the particular software application installed thereon. Other examples are also possible.

Further, the aPaaS system could determine to what extent the enterprise is in compliance with its software licenses. Determining such compliance may be referred to as "reconciliation" and may be in accordance with a license metric associated with a specified software license. For example, the aPaaS system may run discovery on computing devices within managed network 300 to determine how many times each software application has been installed as discussed. In other examples, the aPaaS system may rely on past discovery to determine how many instances of the software application have been installed. For instance, the configuration items stored on CMDB 500 may be sufficient to determine how many instances are installed within managed network 300. In either case, the aPaaS system may also determine what software application license rights are held by the managed network. Finally, the aPaaS system may associate the installed software applications with the software license rights, such as according to their respective license metrics, and the aPaaS system may then respectively determine whether the software application(s) are in or out of compliance.

To facilitate this, the aPaaS system could provide for establishment of software configurations, so as to help with the reconciliation process. A given software configuration could track license rights allocations and consumption associated with a particular software application, as defined by that application's publisher, title, version, and/or edition. The aPaaS system could then run reconciliation with respect to this software configuration, so as to determine whether license rights consumption for the particular software application complies with the license rights allocations for the particular software application. Thus, software configurations could help an enterprise figure out whether usage of software applications complies with licenses associated with the software applications.

Generally, the aPaaS system could provide for establishment of software configurations in various ways. For example, as discussed, the aPaaS system may provide, to a client device, a representation of a graphical user interface (GUI) that includes feature(s) for establishing software configuration(s). Through this GUI, a user of the client device may provide input to specify identifying information (e.g., a respective publisher, title, version, and/or edition) and license right allocations for the given software application, so as to establish a given software configuration for a given software application. Further, the aPaaS system could update the given software configuration to specify an installation count for the given software application according to the above-mentioned discovery, thereby causing the given software configuration to indicate a license rights consumption for the given software application.

Given this, the aPaaS system could determine whether compliance exists on various levels, such as on a publisher level, title level, version level, and/or edition level.

By way of example, several software applications may have a common publisher and title, but may be of different versions and/or editions. In this situation, the system could run reconciliation based on the respective software configurations of those software applications, so as to determine whether compliance exists respectively for each version and/or edition. For instance, the system could determine that the enterprise is compliant with respect to a first version, a first edition of a second version, as well as a second edition of the second version etc. In addition to determining whether compliance exists on the version and/or edition levels, the system could determine whether compliance exists on the title level. To do so, the system could determine total license right allocations and total license rights consumption for those software applications that have the common publisher and title. In practice, the system could determine the total license right allocations as a sum of the license right allocations respectively specified in the software configurations of these software applications, and the system could determine the total license rights consumption by determining a total installation count for these software applications according to the discovery. Then, the system could determine whether compliance exists with respect to the title by determining whether the total license rights consumption complies with the total license right allocations. Numerous other examples are also possible.

In this regard, the aPaaS system could provide, to a client device, a representation of a GUI that indicates whether compliance exists respectively on various levels. In practice, the system may generate such a representation according to the above-described determinations of whether compliance exists on various levels.

For example, the system could provide such a representation in the above-described situation where software applications have a common publisher and title, but are of different respective versions and/or editions. In this example, the representation may include, (i) for each such software application version/edition, a respective indication of whether the version/edition is in or out of compliance, and (ii) an indication of whether compliance exists with respect to the title. Other examples are also possible.

Once the aPaaS system determines an extent to which the enterprise is in compliance with its software licenses, the aPaaS system may perform an action based on this determined extent. For example, the system may provide, via a GUI, a recommendation to purchase additional licenses, to install a software application on more devices, or to uninstall the software application from certain computing devices within the managed network. In some examples, the aPaaS system, upon determination that certain criteria have been met, may automatically purchase additional software, or reorganize which devices, processors, or cores upon which the software applications are installed. Various other examples are also possible.

Although establishment of software configurations can help an enterprise track an extent to which the enterprise is in compliance with its software licenses, various problematic situations could still arise. For instance, if the enterprise does not establish a software configuration for a given software application, the system may end up providing a representation of a GUI that lacks clarity with respect to whether or not compliance exists on certain level(s). Such a situation could arise in various ways.

For example, assuming that the given software application and other software applications have a common publisher and title but are of different respective versions and/or editions, the system may end up providing a representation indicating that compliance exists on the version and edition levels but not on the title level, which could lead to confusion.

Specifically, the system may have respective software configurations for the other software applications but not for the given software application, and thus the system could determine whether compliance exists respectively for the other software application but would not run reconciliation for the given software application. Consequently, the system might evaluate the existing software configurations and determine that compliance exists on the version and edition levels, even though the given software application may or may not be in compliance.

Also, because the system does not have a software configuration for the given software application, the system might determine, with respect to the common title, a total license right allocations that does not account for license right allocations of the given software application. Yet, because the system may have an installation count for the given software application according to discovery, the system may still account for that installation count when determining the total license rights consumption with respect to the common title. Consequently, the system would determine that compliance does not exist on the title level, even though the system determined that compliance exists on the version and edition levels.

As a result, the system may provide, to a client device, a representation that (i) does not include any indication of whether the given software application is in compliance, (ii) includes respective indications that all of the other software applications are in compliance, which in turn indicates that the enterprise is in compliance on the version and edition levels, and (iii) includes an indication that the enterprise is out of compliance on the title level. This is problematic, as it might be unclear to a user of the client device why the enterprise is out of compliance on the title level when it is in compliance on the version and edition levels.

FIG. 6 illustrates an example representation 600 of a GUI that lacks clarity with respect to whether or not compliance exists on certain level(s). The representation 600 includes sections 602 and 604 that provide respective reconciliation results on different levels. Section 602 including identifying information for a particular publisher "ABC" and title "XYZ" as well as reconciliation results on the title level. For example, status 606 indicates that the enterprise is out of compliance on the title level. In contrast, section 604 shows under tab 608 a table including an entry 610 for software application "ABC XYZ V1" as well as an entry 612 for software application "ABC XYZ V2". Those software applications have the same publisher "ABC" and title "XYZ" in line with section 602, but are of different respective versions "V1" and "V2". Further, entries 610-612 are based respectively on existing software configurations (software models) for software applications "ABC XYZ V1" and "ABC XYZ V2" and show that the enterprise is in compliance respectively for each of these software applications, thereby indicating that compliance exists on the version level.

Although this representation 600 provides some helpful information, this representation 600 is still problematic. In line with the discussion above, this representation 600 lacks clarity as to why the enterprise is out of compliance on the title level when it is in compliance on the version level. Namely, the representation 600 does not list under tab 608 any entries including out-of-compliance indication(s) for other software application(s) that have the same publisher "ABC" and title "XYZ" but are of different version(s) (e.g., different from "V1" and "V2"). As noted, this may occur because the enterprise did not establish respective software configuration(s) for those other software application(s). As such, a user reviewing this representation 600 might not know whether additional software licenses should be purchased and/or which software licenses to purchase, among other uncertainties.

Furthermore, section 604 also includes tab 614 that is selectable to cause display of a table representing unlicensed installs. Specifically, the system may discover numerous installations of other software applications that have same publisher "ABC" and title "XYZ", yet the system may not have existing software configurations for those software applications. In this situation, the table under tab 614 may contain an entry for each such discovered installation. Yet, it may be a time-consuming and error-prone process for user(s) to review those numerous entries (e.g., 751 entries) in an attempt to ascertain whether additional software licenses should be purchased and/or which software licenses to purchase. Other illustrations are also possible.

Nonetheless, lack of appropriate software configurations for software applications is not limited to being problematic for just the display of information. Instead, it can cause an enterprise to be unable to accurately use the information gathered during discovery to determine the contents of the managed network.

VII. Automatic Generation of a Software Configuration

Disclosed herein is an approach for automatic generation of a software configuration. According to the disclosed approach, the system could determine that existing software configurations do not support a particular software application deployed on a managed network, and the system could responsively generate and store a new software configuration for that particular software application.

The disclosed approach could provide for various advantages and improvements. First, automatic generation of the new software configuration would help ensure that the system can provide a representation of a GUI indicating whether the particular software application is in or out of compliance. Second, due to generation of the new software configuration, this representation would also clearly and unambiguously indicate whether the enterprise is in or out of compliance respectively on various level(s), thereby overcoming the above-described issues. Third, because the system can automatically generate software configuration(s), an enterprise doesn't necessarily have to engage in the time-consuming and error-prone process of establishing software configuration(s) in a non-automated fashion. As such, the disclosed approach can help the enterprise better track license rights allocations and consumption, so as to ensure proper compliance.

Figure 7:
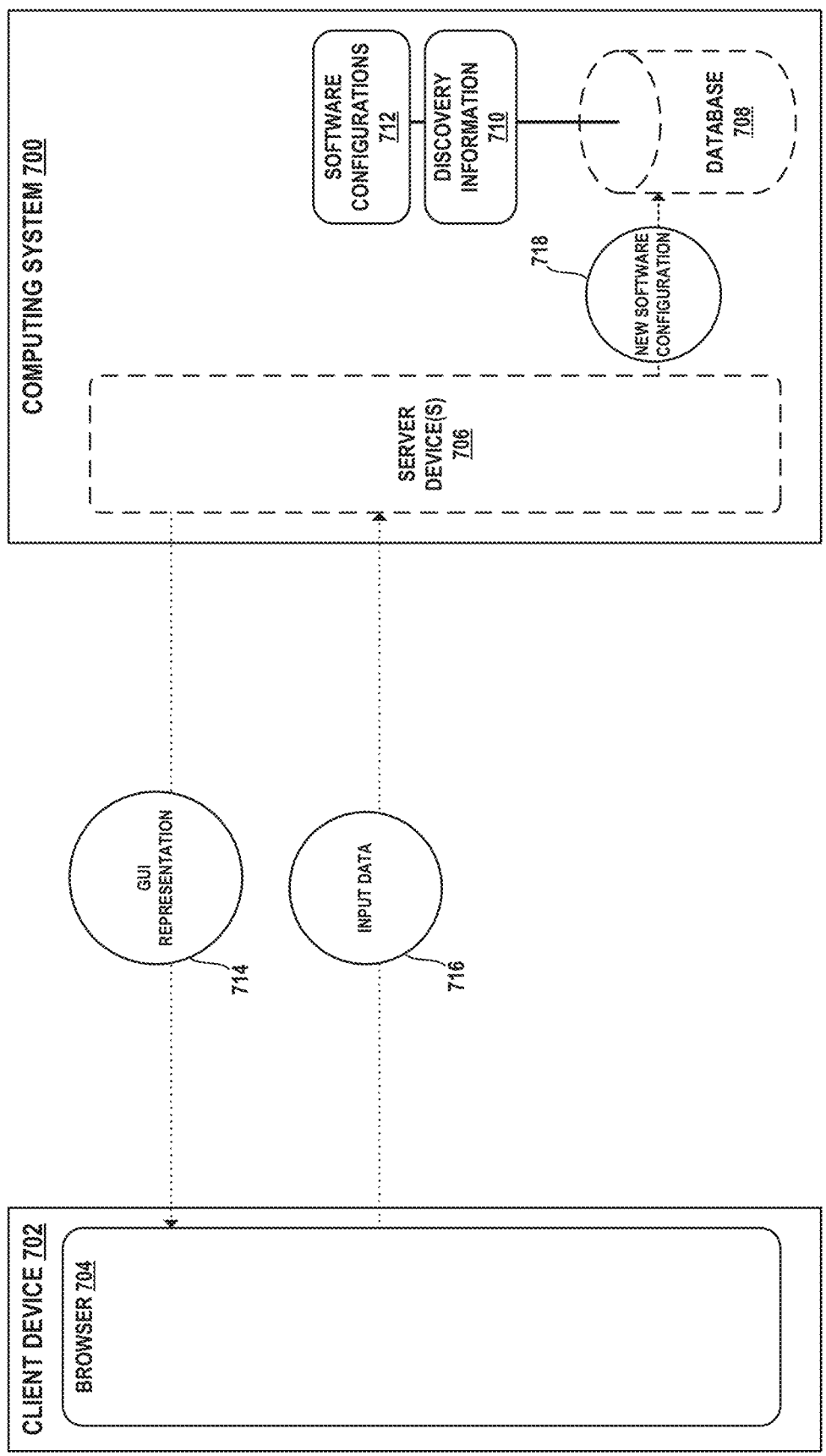
FIG. 7 depicts communications between a computing system and a client device, in accordance with example embodiments.

FIG. 7 illustrates features, components, and/or operations of a computing system 700 and of a client device 702. Although FIG. 7 illustrates a specific arrangement, operations disclosed herein may be carried out in the context of similar and/or other arrangement(s) as well without departing from the scope of the present disclosure.

Specifically, client device 702 may be one of the client devices 302 on the managed network 300, for example. Generally, the client device 702 may engage in communication with computing system 700, such as via wired and/or wireless communication link(s) (not shown). Moreover, as shown, the client device 702 may be configured to operate a web browser 704, which is an application that may retrieve, present, and/or navigate through information on the World Wide Web and/or on private websites.

The browser 704 may include a web-display tool (not shown) that provides for or otherwise supports display of information, such as information received from computing system 700. For example, the web-display tool may display a representation of a GUI that clearly and unambiguously indicates whether the enterprise is in or out of compliance on various level(s) with respect to its various software licenses.

Further, computing system 700 may include server device(s) 706. The server device(s) 706 may contain or may otherwise have access to program instructions executable by processor(s), so as to cause the computing system 700 to carry out various operations described herein. On this point, the server device(s) 706 may include server device(s) disposed within a computational instance of a remote network management platform, such as computational instance 322 of remote network management platform 320, and/or may include server device(s) disposed within a managed network. Thus, the various operations described herein could be carried out by just one server device and/or could be distributed among two or more of server devices in any feasible manner. As such, the computing system 700 could include features and/or components of a managed network and/or of a remote network management platform that supports remote management of the managed network.

Also, the computing system 700 may include a database 708. This database 708 could be a CMDB of a computational instance, such as CMDB 500 for example. Additionally or alternatively, database 708 may be a database that is different from a CMDB.

As shown, the database 708 contains discovery information 710 and software configurations 712. In line with the discussion above, the discovery information 710 may be for installations of software applications on device(s) of the managed network, and may include respective indications of application publishers, application titles, application versions, and/or application editions for the software applications. Also, as noted, software configurations 712 may respectively indicate license right allocations and license rights consumption for at least some of those software applications.

Furthermore, the computing system 700 may be configured to provide, for display by the client device 702, a GUI representation 714. In line with the discussion above, the representation 714 may indicate whether the enterprise is in or out of compliance on various level(s) with respect to at least some of its software license(s). Also, the computing system 700 may receive input data 716 from the client device 702, such as when an individual uses the client device 702 to trigger display of the representation 714, to activate a control on the representation 714, and/or to enter information via the representation 714, among other options.

Given this arrangement, the computing system 700 could determine that the software configurations 712 do not support a particular software application. Namely, the computing system 700 could determine that the database 708 does not contain a software configuration indicating license rights allocations and consumption for the particular software application. In practice, the computing system 700 could do so by comparing the discovery information 710 to the software configurations 712.

Specifically, the computing system 700 could use the discovery information 710 as basis to determine that the particular software application is installed on device(s) of the managed network, and could then determine whether any of the software configurations 712 are associated with that particular software application. In this process, the computing system 700 could determine that the discovery information 710 indicates particular attributes for the particular software application, such as a particular publisher, title, version, and/or edition. Also, the computing system 700 may evaluate the identifying information respectively specified by the software configurations 712. Through this evaluation, the computing system 700 could determine that none of the software configurations 712 have respective identifying information that matches the particular attributes, and could responsively conclude that the software configurations 712 do not support the particular software application.

Once the computing system 700 determines that the software configurations 712 do not support a particular software application, the computing system 700 may responsively generate a particular (new) software configuration 718 for the particular software application.

As an initial matte-r, the computing system 700 may generate the software configuration 718 such that the software configuration 718 is associated with the particular attributes of the particular software application. For example, if the computing system 700 determines that the discovery information 710 indicates a particular publisher, a particular title, and a particular version for the particular software application, then the computing system 700 may associate the software configuration 718 with those particular attributes. Namely, the computing system 700 would generate the software configuration 718 to specify identifying information including the particular publisher, the particular title, and the particular version for the particular software application. Other examples are also possible.

Additionally, the computing system 700 may generate the software configuration 718 to indicate a particular right allocation of zero rights. Specifically, the disclosed approach may leverage an assumption that the computing system 700 does not yet have any information related to software license(s) for the particular software application, such as information related to a non-zero number of license rights and/or license metric(s) associated with the particular software application. Given this, the computing system 700 may be configured by default to generate the software configuration 718 to indicate the particular right allocation of zero rights. However, as further discussed herein, a user could enter, via a GUI, information related to software license(s) for the particular software application, such as after obtaining the software license(s) for instance, and the computing system 700 could update the software configuration 718 to include this information at that point.

Further, the computing system 700 may generate the software configuration 718 to indicate particular rights consumption according to the discovery information. Specifically, the discovery information 710 may indicate the number of computing devices on the managed network that have the particular software application respectively installed thereon, and the computing system 700 could generate the software configuration 718 to indicate a particular installation count for the particular software application according to this discovery information 710. On this point, the disclosed approach may leverage an assumption that a software license for the particular software application may include "per-device" license rights, and thus the particular installation count may be in accordance with a per-device license metric by default. However, as further discussed herein, a user could enter, via a GUI, information about a license metric associated with the particular software application, and the computing system 700 could determine an installation count according to that license metric and could update the software configuration 718 to indicate that determined installation count.

In another aspect, the computing system 700 may update the database 708 to include the software configuration 718. For example, the computing system 700 may store in the database 708 identifying information (e.g., a particular publisher, tile, version, and/or edition) for the particular software application, an indication of the particular rights consumption for the particular software application according to the discovery information, and an indication of a particular right allocation of zero rights for the particular software application. Also, the computing system 700 could associate this information in the database 708 with a unique identifier for the software configuration 718, so that the computing system 700 could later refer to this identifier to determine that the information is associated with software configuration 718.

In some implementations, the computing system 700 could run reconciliation with respect to the software configuration 718 and could update the software configuration 718 according to results of that reconciliation. For example, the computing system 700 could determine that the particular rights consumption is greater than the particular rights allocation of zero rights, and could responsively update the software configuration 718 to indicate that the particular rights consumption does not comply with the particular rights allocation. The computing system 700 could do so during or after generation of the software configuration 718. In any case, the results of this reconciliation may be that the particular software application is out of compliance, because the computing system 700 may not yet have information about software licenses for the particular software application but may have information about installations of this particular software application on the managed network. Other examples are also possible.

Due to automatic generation of the software configuration 718, the computing system 700 would advantageously take the particular software application into account when determining whether the enterprise is in or out of compliance respectively on various level(s). For example, in a situation where the particular software application and other software application(s) have common publisher and title but are of different respective version and/or editions, the computing system 700 would unambiguously determine that the enterprise is out of compliance on the title level and on the version and/or edition levels.

Specifically, the computing system 700 could determine based on software configuration 718 that the particular software application is out of compliance and thus that the enterprise is out of compliance on the version and edition levels, even though the computing system 700 may still determine that the other software application(s) with the same publisher and title are all in compliance. Also, because the computing system 700 has the software configuration 718, the computing system 700 would account for license right allocations of the given software application when determining whether the enterprise is in compliance on the title level. On this point, due to the zero rights allocation and the non-zero installation count indicated by the software configuration, the computing system 700 would still determine that compliance does not exist on the title level, and could carry out such a determination as discussed above. But due to the automatic generation of the software configuration 718, the situation at issue would no longer gives rise to ambiguity, as the computing system 700 would determine that compliance does not exist on the title level nor on the version and edition levels.

Accordingly, in this situation, the computing system 700 may end up providing a representation of a GUI that is clear with respect to whether or not compliance exists on various level(s). In particular, the computing system 700 may provide, to client device 702, a representation that includes: (i) an indication that the particular software application is out of compliance, (ii) respective indications that the other software application(s) with the same publisher and title are in compliance, and (iii) an indication that the common title is out of compliance. Herein, the computing system 700 could indicate that a certain software application is in or out of compliance by indicating whether its corresponding software configuration is in or out of compliance, among other options. In any case, this representation is particularly advantageous, as it makes clear to a user of the client device 702 that the enterprise is out of compliance on the title level because it is out of compliance on the version and/or edition levels, and more specifically because the particular software application is out of compliance.

Figure 8:
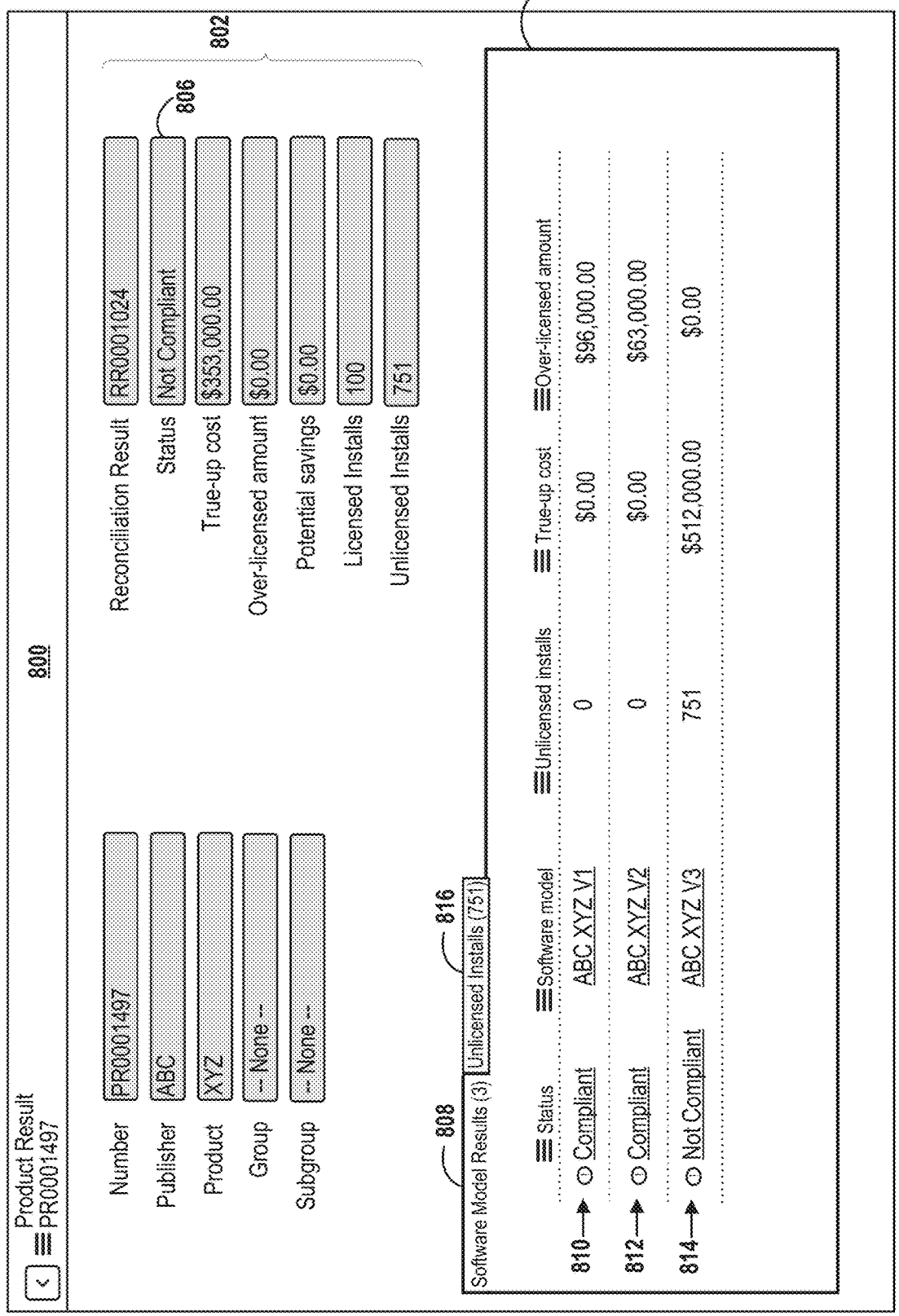
FIG. 8 depicts another GUI representation, in accordance with example embodiments.

FIG. 8 illustrates an example representation 800 of a GUI that is clear with respect to whether compliance exists on certain level(s). The representation 800 includes sections 802 and 804 that provide respective reconciliation results on different levels. In line with the representation 600 of FIG. 6, section 802 including identifying information for publisher "ABC" and title "XYZ" and a status 806 indicating that the enterprise is out of compliance on the title level. Further, section 804 shows under tab 808 a table including entries 810-812 that are based respectively on existing software configurations for software applications "ABC XYZ V1" and "ABC XYZ V2", as discussed in association with representation 600. In this scenario, however, computing system 700 automatically generated a new software configuration for a software application "ABC XYZ V3" that also has the publisher "ABC" and title "XYZ" but is of a different version "V3", and thus representation 800 also includes an entry 814 for this software application. But unlike entries 810-812, entry 814 indicates that software application "ABC XYZ V3" is out of compliance. Consequently, representation 800 unambiguously indicates that the enterprise is out of compliance on both the title and version levels.

Furthermore, representation 800 could also optionally include a tab 816 configured similarly to tab 614 of representation 600. Specifically, tab 816 is selectable to cause display of a table representing unlicensed installs. Those unlicensed installs may include installations of the software application "ABC XYZ V3". And because representation 800 makes clear that the enterprise is out of compliance on the version level (and thus on the title level) due to software application "ABC XYZ V3" being out of compliance, a user doesn't have to rely on entries under tab 816 to ascertain whether additional software licenses should be purchased and/or which software licenses to purchase. Yet, it may still be worthwhile for the representation 800 to include tab 816, so as to allow for review of specific installations of the software application "ABC XYZ V3". Other illustrations are also possible.

In a further aspect, the disclosed approach could enable the computing system 700 to use an alternative technique to determine whether compliance exists on the title level. Specifically, the disclosed approach could cause the computing system 700 to have a respective software configuration for each software application installed on the managed network. So in a situation where certain software applications have a common publisher and title but are of different respective version and/or editions, the computing system 700 would no longer have to determine total license right allocations and consumption for those software applications as discussed, so as to then determine whether the enterprise is in or out of compliance on the title level. Rather, the computing system 700 could determine that compliance exists on the title level if the computing system 700 determines that each of those software applications are respectively in compliance according to their corresponding software configurations. Or the computing system 700 could determine that compliance does not exist on the title level if the computing system 700 determines at least one of those software applications is respectively out of compliance according to its corresponding software configuration. This alternative technique could help save computational resources, and may have other advantages as well.

In yet a further aspect, computing system 700 could provide, to client device 702, a representation of a GUI that enables updating of the new software configuration 718. In particular, the representation may include a feature that enables entry of information related to software license(s) for the particular software application, such as information indicating a non-zero number of license rights and/or license metric(s) associated with the particular software application. If the enterprise previously obtained license(s) for the particular software application, then a user could enter, via the GUI, information about those license(s). Or the user could obtain such license(s) on behalf of the enterprise and could then enter the information. In any case, once the information is entered, the computing system 700 could update the software configuration 718 to include this information. In turn, the computing system 700 could run reconciliation on various level(s) as discussed, and that reconciliation would take the entered information into account. In this way, the disclosed approach can help the enterprise better track license rights allocations and consumption, so as to ensure proper compliance.

VIII. Example Operations

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 may involve determining, by one or more server devices and from a database, discovery information for installations of software applications on computing devices of a managed network, where the one or more server devices and the database are disposed within a remote network management platform associated with the managed network, where the database contains the discovery information, where the database also contains software configurations for a subset of the software applications, where at least some of the discovery information for the installations was obtained by the remote network management platform indirectly accessing the computing devices, where the discovery information for the installations includes respective indications of application publishers, application titles, and application versions for the software applications, and where the software configurations respectively indicate rights allocations and rights consumption for each of the subset of the software applications.

Block 902 may involve determining, by the one or more server devices, that the software configurations do not support a particular software application of the software applications, where the discovery information for the installations indicates that the particular software application is installed on one or more of the computing devices of the managed network.

Block 904 may involve, in response to determining that the software configurations do not support the particular software application, generating, by the one or more server devices, a particular software configuration for the particular software application, where the particular software configuration indicates: (i) a particular rights allocation of zero rights, and (ii) a particular rights consumption according to the discovery information for the installations.

Block 906 may involve updating, by the one or more server devices, the database to include the particular software configuration.

In some embodiments, the discovery information for the installations may also include indications of respective installation counts of the software applications, and the respective installation counts may represent numbers of computing devices on the managed network that have the software applications installed. In such embodiments, the particular software configuration indicating the particular rights consumption may involve the particular software configuration indicating a particular installation count for the particular software application according to the discovery information.

In some embodiments, the one or more server devices may be configured to: determine that the particular rights consumption is greater than the particular rights allocation; and in response to determining that the particular rights consumption is greater than the particular rights allocation, updating the particular software configuration to indicate that the particular rights consumption does not comply with the particular rights allocation.

In some embodiments, determining that the software configurations do not support the particular software application may involve: based on the respective indications included in the discovery information for the installations, determining a particular application publisher, a particular application title, and a particular application version for the particular software application; and determining that the software configurations do not include any associated with the particular application publisher, the particular application title, and the particular application version.

In such embodiments, generating the particular software configuration may involve associating the particular software configuration with the particular application publisher, the particular application title, and the particular application version.

Additionally or alternatively, in such embodiments, the discovery information for the installations may also include respective indications of application editions for the software applications, and determining that the software configurations do not support the particular software application may involve, based on the respective indications included in the discovery information for the installations, determining a particular application edition for the particular software application. Moreover, determining that the software configurations do not include any associated with the particular application publisher, the particular application title, and the particular application version may involve determining that the software configurations do not include any associated with the particular application publisher, the particular application title, the particular application version, and the particular application edition.

Additionally or alternatively, in such embodiments, generating the particular software configuration may involve associating the particular software configuration with the particular application publisher, the particular application title, the particular application version, and the particular application edition.

Additionally or alternatively, in such embodiments, a second particular software application of the software applications may have the particular application publisher, the particular application title, and a second particular application version according to the discovery information, and a second particular software configuration for the second particular software application may indicate (i) a second particular rights allocation and (ii) a second particular rights consumption. In such embodiments, the one or more server devices may be configured to: determine that the particular software configuration is out of compliance with the particular rights allocation; determine that the second particular software configuration is in compliance with the second particular rights allocation; determine that the particular application title is out of compliance with a title-level rights allocation of the particular application title; and provide, to a client device associated with the managed network, a representation of a graphical user interface that includes: (i) a first indication that the particular software configuration is out of compliance with the particular rights allocation, (ii) a second indication that the second particular software configuration is in compliance with the second particular rights allocation, and (iii) a third indication that the particular application title is out of compliance with the title-level rights allocation of the particular application title.

Additionally or alternatively, in such embodiments, the representation may include a table containing entries, where a first entry in the table may represent the particular software configuration and a non-zero number of unlicensed installs of the particular software application, and where a second entry in the table may represent the second particular software configuration and zero unlicensed installs of the second particular software application.

Additionally or alternatively, in such embodiments, the table may be disposed upon a first tab of the representation, and a second tab of the representation includes a second table containing entries for each of the computing devices on the managed network with the particular software application installed.

Additionally or alternatively, in such embodiments, determining that the particular application title is out of compliance with the title-level rights allocation of the particular application title may involve determining that at least one of the particular software configuration and the second particular software configuration is out of compliance with its respective rights allocation.

IX. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a processor; and
a memory, accessible by the processor, the memory storing instructions that, when executed by the processor, cause the processor to perform operations comprising:
obtaining, via the processor, from a configuration management database (CMDB), discovery information for installations of software applications on computing devices within a managed network managed by a remote network management platform, the discovery information indicating that a particular software application installation is installed on one or more of the computing devices, wherein the CMDB contains software configurations for a subset of the software application installations, and wherein the software application installations and the computing devices are represented in the CMDB as configuration items (CIs), the software configurations indicating rights allocations and rights consumption for each software application installation of the subset of the software application installations;
determining, using one or more configurable identification rules, that none of the software configurations stored in the CMDB match the particular software application installation of the software application installations;
generating a particular software configuration for the particular software application installation, wherein the particular software configuration indicates: (i) a particular rights allocation of zero rights, and (ii) a particular rights consumption according to the discovery information for the software application installations; and updating the CMDB to include the particular software configuration.

2. The system of claim 1, wherein the discovery information for the software application installations includes an indication of an installation count for each software application of the software applications, and wherein the particular software configuration indicates a particular installation count for the particular software application according to the discovery information.

3. The system of claim 1, wherein the operations comprise:
   determining that the particular rights consumption is greater than the particular rights allocation; and
   updating the particular software configuration to indicate that the particular rights consumption does not comply with the particular rights allocation.

4. The system of claim 1, wherein generating the particular software configuration comprises associating the particular software configuration with a particular application publisher, a particular application title, and a particular application version via the discovery information.

5. The system of claim 4, wherein the discovery information includes an indication of an application edition for each software application of the software applications, and wherein determining that none of the software configurations stored in the CMDB match the particular software application installation comprises:
   determining, from the discovery information for the software application installations, a particular application edition for the particular software application installation.

6. The system of claim 4, wherein a second particular software application installation of the software application installations is associated with the particular application publisher, the particular application title, and a second particular application version according to the discovery information, wherein a second particular software configuration for the second particular software application installation indicates (i) a second particular rights allocation and (ii) a second particular rights consumption, and wherein the operations comprise:
   determining that the particular software configuration does not comply with the particular rights allocation;
   determining that the second particular software configuration complies with the second particular rights allocation;
   determining that the particular application title does not comply with a title-level rights allocation of the particular application title; and
   providing, to a client device associated with the managed network, a representation of a graphical user interface that includes: (i) a first indication that the particular software configuration does not comply with the particular rights allocation, (ii) a second indication that the second particular software configuration complies with the second particular rights allocation, and (iii) a third indication that the particular application title does not comply with the title-level rights allocation of the particular application title.

7. The system of claim 6, wherein the representation includes a table containing entries, wherein a first entry in the table represents the particular software configuration and a non-zero number of unlicensed installs of the particular software application installation, and a second entry in the table represents the second particular software configuration and zero unlicensed installs of the second particular software application installation.

8. The system of claim 7, wherein the table is displayed when a first tab of the representation is selected, and wherein selection of a second tab of the representation causes a second table to be displayed that contains entries for each of the computing devices of the managed network on which the particular software application installation is installed.

9. The system of claim 6, wherein determining that the particular application title does not comply with the title-level rights allocation of the particular application title comprises:
   determining that at least one of the particular software configuration and the second particular software configuration does not comply with its respective rights allocation.

10. A method comprising:
    obtaining, via one or more server devices disposed within a remote network management platform associated with a managed network and from a configuration management database (CMDB), discovery information for installations of software applications on computing devices of the managed network, the discovery information indicating that a particular software application installation is installed on one or more of the computing devices, wherein the CMDB contains software configurations for a subset of the software application installations, and wherein the software application installations and the computing devices are represented in the CMDB as configuration items (CIs), the software configurations indicating rights allocations and rights consumption for each software application installation of the subset of the software application installations;
    determining, by the one or more server devices and using one or more configurable identification rules, that none of the software configurations stored in the CMDB match a particular software application installation of the software application installations;
    generating, by the one or more server devices, a particular software configuration for the particular software application installation, wherein the particular software configuration indicates: (i) a particular rights allocation of zero rights, and (ii) a particular rights consumption according to the discovery information for the software application installations; and
    updating, by the one or more server devices, the CMDB to include the particular software configuration.

11. The method of claim 10, wherein the discovery information for the software application installations includes indications of an installation count for each software application of the software applications, and
    wherein the particular software configuration indicating the particular rights consumption comprises the particular software configuration indicating a particular installation count for the particular software application installation according to the discovery information.

12. The method of claim 10, comprising:
    determining, by the one or more server devices, that the particular rights consumption is greater than the particular rights allocation; and
    updating, by the one or more server devices, the particular software configuration to indicate that the particular rights consumption does not comply with the particular rights allocation.

13. The method of claim 10, wherein determining that none of the software configurations stored in the CMDB match the particular software application installation comprises:

determining, from the discovery information for the software application installations, a particular application publisher, a particular application title, and a particular application version for the particular software application installation; and determining that the software configurations do not include any association with the particular application publisher, the particular application title, and the particular application version.

14. The method of claim 13, wherein generating the particular software configuration comprises associating the particular software configuration with the particular application publisher, the particular application title, and the particular application version.

15. The method of claim 13, wherein the discovery information includes an indication of an application edition for each software application of the software applications, and wherein determining that none of the software configurations stored in the CMDB match a particular software application installation:

determining, from the discovery information for the software application installations, a particular application edition for the particular software application installation; and wherein determining that the software configurations do not include any association with the particular application publisher, the particular application title, and the particular application version comprises determining that the software configurations do not include any association with the particular application edition.

16. The method of claim 15, wherein generating the particular software configuration comprises associating the particular software configuration with the particular application publisher, the particular application title, the particular application version, and the particular application edition.

17. The method of claim 13, wherein a second particular software application installation of the software application installations has the particular application publisher, the particular application title, and a second particular application version according to the discovery information, and wherein a second particular software configuration for the second particular software application installation indicates (i) a second particular rights allocation and (ii) a second particular rights consumption, the method comprising:

determining, by the one or more server devices, that the particular software configuration does not comply with the particular rights allocation;

determining, by the one or more server devices, that the second particular software configuration complies with the second particular rights allocation;

determining, by the one or more server devices, that the particular application title does not comply with a title-level rights allocation of the particular application title; and providing, by the one or more server devices and to a client device associated with the managed network, a representation of a graphical user interface that includes: (i) a first indication that the particular software configuration does not comply with the particular rights allocation, (ii) a second indication that the second particular software configuration complies with the second particular rights allocation, and (iii) a third indication that the particular application title does not comply with the title-level rights allocation of the particular application title.

18. An article of manufacture including a non-transitory computer-readable medium, having stored thereon program instructions that, upon execution by a server device of a remote network management platform associated with a managed network, cause the server device to perform operations comprising:

obtaining, from a configuration management database (CMDB) disposed within the remote network management platform, discovery information for installations of software applications on computing devices of the managed network, wherein the discovery information for the software application installations indicates that a particular software application installation is installed on one or more of the computing devices of the managed network, the CMDB containing software configurations for a subset of the software application installations, the software configurations indicating rights allocations and rights consumption for each software application installation of the subset of the software application installations;

determining, using one or more configurable identification rules, that none of the software configurations stored in the CMDB match the particular software application installation of the software application installations;

generating a particular software configuration for the particular software application installation, wherein the particular software configuration indicates: (i) a particular rights allocation of zero rights, and (ii) a particular rights consumption according to the discovery information for the software application installations; and updating the CMDB to include the particular software configuration.

19. The article of manufacture of claim 18, wherein generating the particular software configuration comprises associating the particular software configuration with a particular application publisher, a particular application title, and a particular application version via the discovery information.

20. The article of manufacture of claim 19, wherein a second particular software application installation of the software application installations is associated with the particular application publisher, the particular application title, and a second particular application version according to the discovery information, wherein a second particular software configuration for the second particular software application installation indicates (i) a second particular rights allocation and (ii) a second particular rights consumption, and wherein the operations comprise:

determining that the particular software configuration does not comply with the particular rights allocation;

determining that the second particular software configuration complies with the second particular rights allocation;

determining that the particular application title does not comply with a title-level rights allocation of the particular application title; and providing, to a client device associated with the managed network, a representation of a graphical user interface that includes: (i) a first indication that the particular software configuration does not comply with the particular rights allocation, (ii) a second indication that the second particular software configuration complies with the second particular rights allocation, and (iii) a third indication that the particular application title does not comply with the title-level rights allocation of the particular application title.

\* \* \* \* \*